R. FERGUSSON.
FINE GOLD SAVING MACHINE.
APPLICATION FILED MAR. 5, 1920.
1,435,825.
Patented Nov. 14, 1922.
2 SHEETS—SHEET 2.
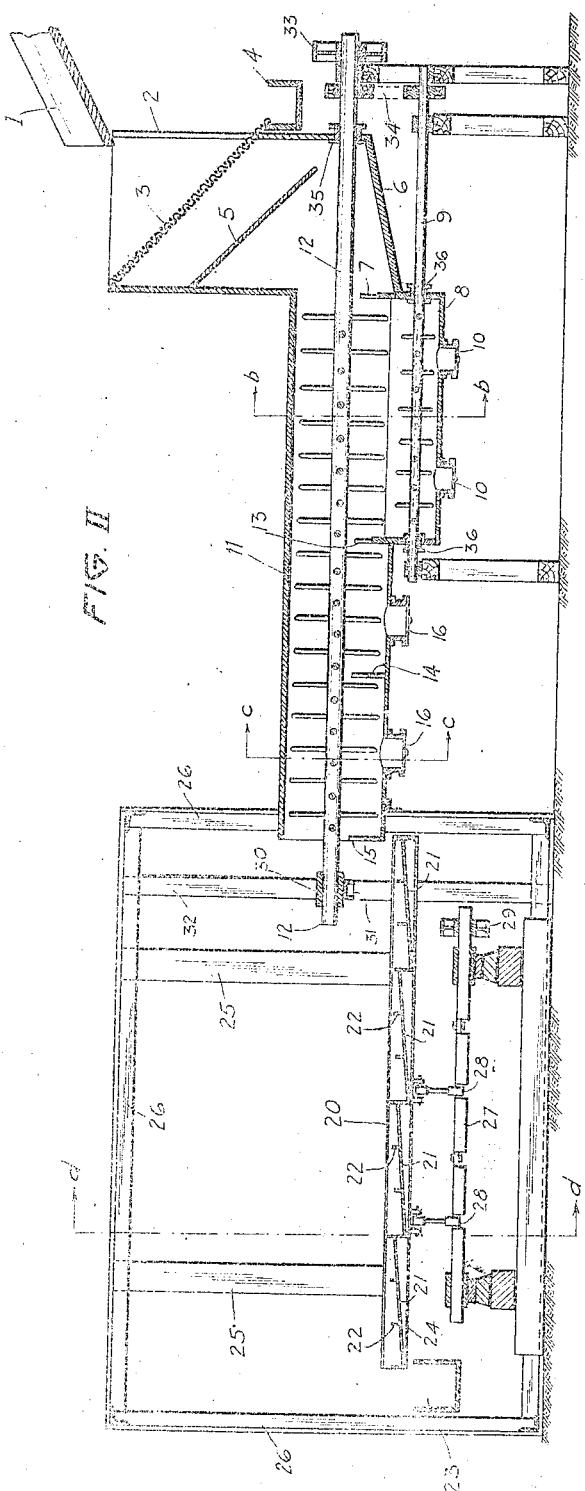
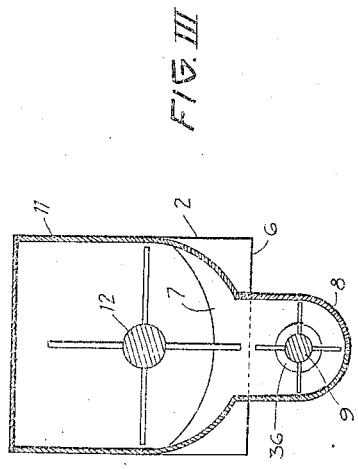
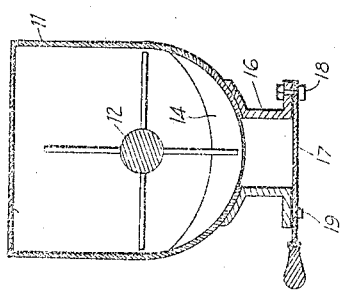
INVENTOR
R. Fergusson.
BY *Goldberg*
ATTORNEY Patented Nov. 14, 1922.

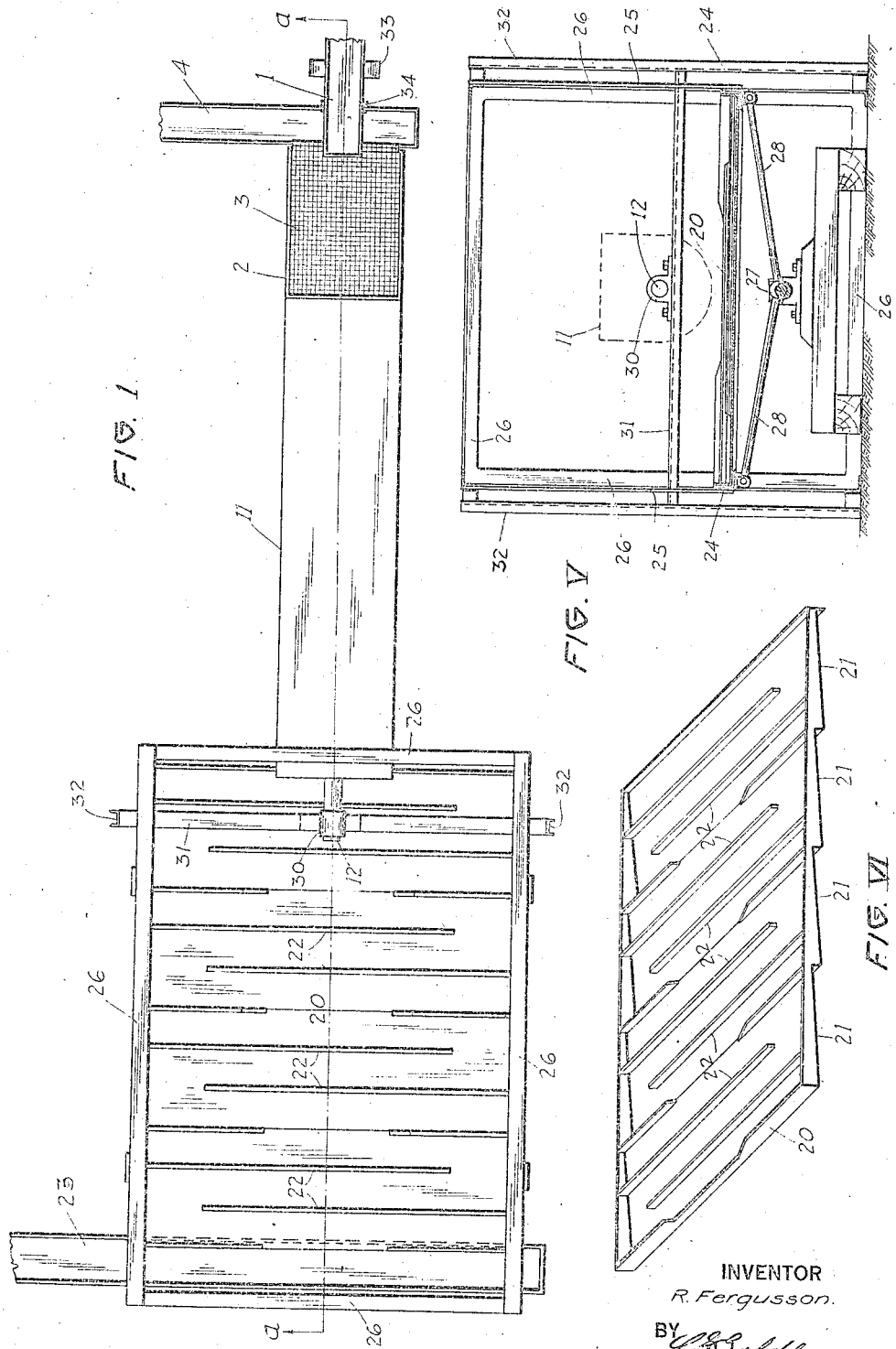

1,435,825

UNITED STATES PATENT OFFICE.

ROBERT FERGUSSON, OF PORTLAND, OREGON.

FINE-GOLD-SAVING MACHINE.

Application filed March 5, 1920. Serial No. 363,626.

*To all whom it may concern:*

Be it known that I, ROBERT FERGUSSON, a citizen of the United States, residing at Portland, in the county of Multnomah and State of Oregon, have invented a new and useful Fine-Gold-Saving Machine, of which the following is a specification.

My invention relates to improvements in fine gold saving machines in which the gang mass of gold-bearing detritus is sluiced through an apparatus and in its course subjected to violent agitation, whereby the smallest particles of gold are precipitated into various entrapping means.

The great problem among mining men has been the difficulty of recovering the extreme fine gold, known as granular, dust, flake and float gold. Especially the latter variety has, so far, baffled all experts; the dirt coat which surrounds it, imparts sufficient buoyancy to cause it to be carried away with the tailings; and again, if said dirt coat is removed, and the surface skin of the water happens to get hold of float gold, it will infallibly float away on the surface of the water.

However, I discovered that, once submerged, float gold will sink almost as quickly as a nugget; and I further discovered that violent agitation, which keeps all of the gangue matter in suspense and in a loosened condition, causes the metals of greater specific gravity to precipitate very readily. An effective entrapping means, which will then keep the precipitated metals absolutely out of the current, will then also be the means of accomplishing the results which I desire, namely the saving of fine gold and other precious metals.

The objects of my invention are to furnish a machine which will agitate the gangue mass so violently that every dirt coat is effectively removed and the clean gold positively submerged, whereby precipitation is instantly achieved.

Another object is to furnish a machine which will accomplish amalgamation without perceptible loss of mercury.

A further object is to eliminate the disadvantages inherent in machines of the inclined type by keeping a majority of the working parts of my machine on a level or nearly so and rather increasing instead the length of construction within reasonable proportions.

Other objects of my invention are to be found in the construction and combination of the various parts, as will appear hereafter.

I attain these objects with the mechanism illustrated in the accompanying drawings, in which—

Fig. I is a plan view of the entire apparatus.

Fig. II is a longitudinal section through Fig. I along the line *a—a*.

Fig. III is a section through Fig. II along the line *b—b*, and shown on a somewhat larger scale.

Fig. IV is a section through Fig. II along the line *c—c*, also on a somewhat enlarged scale.

Fig. V is a section through Fig. II along the line *d—d*.

Fig. VI is an isometric view of the shaker table.

Similar numerals refer to similar parts throughout the several views.

It may be stated at the outset that my apparatus extracts indiscriminately all the precious metals, such as platinum, palladium, osmium, iridium, ruthenium etc., contained in gold-bearing sands, and that the following description includes these metals although gold only may be specifically mentioned.

Referring now to Fig. II we have the sluiceway 1 which delivers the sluice or gangue matter into the box 2. An inclined metal screen 3 within the box separates the finer material from the coarser gravel, and delivers the latter into the chute 4. The fine material drops through the meshes of the screen 3, lands first on the inclined metal plate 5, and slides from there to the inclined bottom 6 of the box 2. Some of the gold will be retained right here by the crescent stop 7 (see also Fig. III). Whatever succeeds in crossing the stop falls into a small conveyor-shaped box 8 which is traversed in longitudinal direction by a fingered agitator shaft 9. Here every particle of metal receives a thorough cleaning, and can finally be withdrawn through the bottom gates 10, while the dirt is whirled upward and escapes through the conveyor 11. The shape and relative position of box 8 and conveyor 11 are clearly shown in Fig. III.

A fingered agitator shaft 12, similar to the one shown at 9, only proportionately larger, rotates within the conveyor 11 and subjects everything that passes to a thorough beating. Any gold which is thereby released, together with any possible overflow from box 8, is caught at the bottom of the conveyor between some additional crescent stops 13, 14 and 15 and can, at convenient time intervals, be withdrawn through the bottom gates 16. The style of gate shown in Fig. IV, with the slide 17 pivoted at 18 and wedged to a watertight joint by the nose 19, has, so far, given very satisfactory service, but there are other styles not shown here, which can be employed with equal success, and which I desire to use as occasion arises.

The apparatus so far described does in itself remarkably excellent work. However, in order to give the smallest particle of gold or quicksilver, as the case may be, a chance to settle down, I empty the volume of sluice from the conveyor 11 on to the broad expanse of a shaker table 20. This table consists of a series of inclined surfaces 21, with two or more cleats 22 on each surface retarding the forward motion of the gold until it lodges at the lower edge of each surface, (a separate illustration of the shaker table is given in Fig. VI). The tailings are finally discharged into the chute 23.

The shaker table 20 rests with its two longitudinal edges loosely in the angle irons 24, the latter are attached to the metal straps 25, and these in turn are suspended from a suitable frame work 26.

To give the table 20 a shaking motion and assist the gold in making its circuitous route around the cleats 22, a crank shaft 27 is mounted underneath the table. The connecting rods 28 from the crank shaft are hinged to the angle irons 24 in the manner shown in Fig. V, and rotation to the shaft is imparted through the pulley 29 by any suitable driving means.

The principle on which my machine operates has thus been fully explained, it only remains to designate by numerals some of the incidental elements. For instance, the bearing 30, which supports one end of the agitator shaft 12, rests on a cross beam 31, and the ends of this beam are attached to the vertical standards 32. But, although the latter form an integral part of the frame work 26, care should be taken to have them standing far enough apart to avoid interference with the operation of the shaker table 20.

The driving pulley for the shaft 12 is designated by the numeral 33, and rotation from the shaft 12 to shaft 9 is transmitted by pulley and belt at the point 34.

The stuffing gland 35 around the shaft 12 prevents loss of valuable material through seepage, and the same applies to the two stuffing glands 36 around the shaft 9.

My objects have been accomplished, and, though I have shown the preferred form of construction, I reserve to myself the right to make any changes which do not violate the spirit and principle of my invention; especially do I wish to emphasize that any means of violent agitation within a horizontal conveyor, when substituted for the previously mentioned finger shaft, is considered as a part of my invention.

I claim—

1. In a fine gold saving machine, a separator comprising a vertical box, means in the box for gravitational separation, a covered horizontal conveyor-trough issuing near the bottom of the box and forming an integral part thereof, a shaft rotating at the longitudinal axis of the conveyor-trough, a plurality of closely spaced fingers radiating from said shaft and at right angles to one another, a semi-cylindrical pocket below the conveyor-trough beginning at the ingress end, proceeding for approximately one-half of the distance of the conveyor-trough and forming an integral part of said trough.

2. In a fine gold saving machine, a separator comprising a vertical box having gravitational means of separation within the box, a covered horizontal conveyor-trough issuing from one side of the box near the bottom, a fingered agitator shaft rotating at the longitudinal axis of the conveyor-trough and journaled in bearings outside said trough, a semi-cylindrical pocket at the bottom of the conveyor-trough, said pocket beginning at the ingress end and continuing for the greater length of said trough, an independent finger shaft rotating at the longitudinal axis of the pocket and journaled in bearings outside of said pocket.

3. In a fine gold saving machine, a separator comprising a vertical box, gravitational means of separation within the box, a covered horizontal conveyor-trough issuing from one side of the box near the bottom, a semi-cylindrical pocket underneath the trough, said pocket beginning at the ingress end and proceeding for about one-half the distance of the conveyor-trough, fingered agitator shafts rotating at the longitudinal axes of the trough and of the pocket and a limited number of crescent-shaped stops in the bottom of the conveyor-trough.

4. In a fine gold saving machine, a separator comprising an open vertical box, gravitational means of separation within the box, a covered horizontal conveyor-trough issuing from one side of the box near the bottom, a semi-cylindrical pocket underneath the trough, agitating means within the trough and the pocket, and a plurality of sliding gate valves in the bottom of the pocket and in the bottom of the conveyor-trough.

Signed by me at Portland, Oregon, this 27th day of February, 1920.

ROBERT FERGUSSON.